US012651753B2

(12) United States Patent
Zhamu et al.

(10) Patent No.: US 12,651,753 B2
(45) Date of Patent: Jun. 9, 2026

(54) CONDUCTING COMPOSITE CURRENT COLLECTOR FOR A BATTERY OR SUPERCAPACITOR AND PRODUCTION PROCESS

(71) Applicant: Global Graphene Group, Inc., Dayton, OH (US)

(72) Inventors: Aruna Zhamu, Springboro, OH (US); Yanbo Wang, Miamisburg, OH (US); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 0 days.

(21) Appl. No.: 16/871,401

(22) Filed: May 11, 2020

(65) Prior Publication Data

US 2021/0351413 A1 Nov. 11, 2021

(51) Int. Cl.
H01M 4/66 (2006.01)
H01G 11/68 (2013.01)
(Continued)

(52) U.S. Cl.
CPC ............ H01M 4/668 (2013.01); H01G 11/68 (2013.01); H01G 11/84 (2013.01); H01M 4/663 (2013.01);
(Continued)

(58) Field of Classification Search
CPC .... H01M 4/668; H01M 50/531; H01M 4/663; H01M 4/666; H01M 4/667; H01M 10/052; H01G 11/68; H01G 11/84
See application file for complete search history.

(56) References Cited

U.S. PATENT DOCUMENTS 4,566,962 A * 1/1986 McGinniss ............ C25D 13/16
156/150
7,071,258 B1 7/2006 Jang et al.
(Continued)

FOREIGN PATENT DOCUMENTS

CN 104600320 A 5/2015
CN 109690836 A * 4/2019 .......... H01M 10/052
(Continued)

OTHER PUBLICATIONS

Wu, Dan, a new strategy for anchoring a functionalized graphene hydrogel in a carbon cloth network to support a lignosulfonate/polyaniline hydrogel as an integrated electrode for a flexible high areal-capacitance supercapacitor. (Year: 2019).*
(Continued)

*Primary Examiner* — Brian R Ohara

(57) ABSTRACT

Provided is a composite thin film current collector for a battery or supercapacitor, the thin film comprising graphene sheets dispersed in or bonded by an electron-conducting polymer network (also referred to as conducting network polymer, crosslinked polymer, or hydrogel polymer) wherein the composite thin film has a thickness from 2 nm to 500 $\mu$m and an electrical conductivity from $10^{-4}$ to $10^4$ S/cm and wherein the graphene sheets occupy from 10% to 99% by weight and the polymer network from 1% to 90% by weight of the total composite weight.

22 Claims, 4 Drawing Sheets

Free-standing PANi-graphene composite film

(51) Int. Cl.

| | | |
|---|---|---|
| *H01G 11/84* | (2013.01) | |
| *H01M 10/052* | (2010.01) | |
| *H01M 50/531* | (2021.01) | |

(52) U.S. Cl.
CPC .......... *H01M 4/666* (2013.01); *H01M 4/667* (2013.01); *H01M 10/052* (2013.01); *H01M 50/531* (2021.01)

(56) References Cited

U.S. PATENT DOCUMENTS

| | | | |
|---|---|---|---|
| 2005/0271574 A1 | 12/2005 | Jang et al. | |
| 2008/0048152 A1 | 2/2008 | Jang et al. | |
| 2012/0141864 A1 | 6/2012 | Juzkow et al. | |
| 2013/0095389 A1 | 4/2013 | Bhardwaj et al. | |
| 2013/0306361 A1 | 11/2013 | Kim et al. | |
| 2013/0319870 A1 | 12/2013 | Chen et al. | |
| 2014/0030590 A1* | 1/2014 | Wang | H01M 4/587 |
| | | | 429/211 |
| 2014/0106217 A1* | 4/2014 | Lee | H01M 4/622 |
| | | | 528/331 |
| 2014/0127488 A1 | 5/2014 | Zhamu et al. | |
| 2015/0086881 A1 | 3/2015 | Zhamu et al. | |
| 2015/0099214 A1* | 4/2015 | Khe | H01M 4/625 |
| | | | 429/523 |
| 2015/0111449 A1 | 4/2015 | Cruz-Silva et al. | |
| 2017/0047588 A1 | 2/2017 | Mukherjee et al. | |
| 2017/0114263 A1* | 4/2017 | Zhamu | C09K 5/14 |
| 2017/0170515 A1* | 6/2017 | Yushin | H01M 10/052 |
| 2017/0207489 A1* | 7/2017 | Zhamu | H01M 4/13 |
| 2017/0221643 A1* | 8/2017 | Zhamu | H01G 11/86 |
| 2018/0040900 A1* | 2/2018 | Zhamu | H01M 10/0525 |
| 2018/0053931 A1* | 2/2018 | Zhamu | C07D 413/14 |
| 2018/0090758 A1* | 3/2018 | Xu | H01M 4/485 |
| 2018/0183066 A1* | 6/2018 | Zhamu | H01M 6/02 |
| 2019/0006662 A1* | 1/2019 | Amine | H01M 10/0525 |
| 2019/0055371 A1* | 2/2019 | Liu | H01G 11/48 |
| 2019/0060663 A1* | 2/2019 | Shepard | G01N 21/6428 |
| 2019/0109358 A1* | 4/2019 | Chai | H01G 11/58 |
| 2020/0052324 A1* | 2/2020 | Ma | H01G 11/70 |

FOREIGN PATENT DOCUMENTS

| | | | | |
|---|---|---|---|---|
| WO | 2012151880 A1 | 11/2012 | | |
| WO | WO-2017074551 A1 * | 5/2017 | ........ | H01M 10/0525 |

OTHER PUBLICATIONS

CN104600320 English language translation.

CN104600320A—English language translation from Google Patent—https://patents.google.com/patent/CN104600320A/en, 6 pages.

Gwon et al., "Flexible energy storage devices based on graphene paper" Energy and Environmental Science (2011) vol. 4, pp. 1277-1283.

PCT/US17/18707 International Search Report and Written Opinion mailed May 4, 2017, 14 pages.

Prabakar et al., "Graphene oxide as a corrosion inhibitor for the aluminum current collector in lithium ion batteries" Carbon (2013) vol. 52, pp. 128-136.

U.S. Appl. No. 15/231,486 Final Office Action dated Apr. 19, 2018, 15 pages.

U.S. Appl. No. 15/231,486 Nonfinal Office Action dated Jun. 21, 2019, 11 pages.

U.S. Appl. No. 15/231,486 Nonfinal Office Action dated Nov. 15, 2018, 17 pages.

U.S. Appl. No. 15/231,486 Nonfinal Office Action dated Oct. 20, 2017, 14 pages.

U.S. Appl. No. 15/231,486 Resp to Final Office Action dated Jul. 16, 2018, 13 pages.

U.S. Appl. No. 15/231,486 Resp to Nonfinal Office Action dated Feb. 1, 2018, 16 pages.

U.S. Appl. No. 15/231,498 Final Office Action dated Jun. 29, 2018, 21 pages.

U.S. Appl. No. 15/231,498 Nonfinal Office Action dated Mar. 21, 2018, 21 pages.

U.S. Appl. No. 15/231,498 Resp Final Office Action dated Aug. 29, 2018, 10 pages.

U.S. Appl. No. 15/231,498 Resp to Nonfinal Office Action May 24, 2018, 11 pages.

Wang et al., "Graphene-coated plastic film as current collector for lithium/sulfur batteries" J. Power Source (2013) vol. 239, pp. 623-627.

WO 2012151880A1—English language translation from Google Patent—https://patents.google.com/patent/WO2012151880A1/en, 15 pages.

WO2012/151880 English language translation.

* cited by examiner

Graphene/conducting
network polymer-
coated metal foil

Press-on rolls

Metal foil

Doctor
blade

Precursor suspension to
graphene/conducting
network polymer

CONDUCTING COMPOSITE CURRENT COLLECTOR FOR A BATTERY OR SUPERCAPACITOR AND PRODUCTION PROCESS

The present disclosure provides a graphene/conducting network polymer composite current collector for a lithium battery or supercapacitor and a related production process. This patent application is primarily directed at a current collector that works with an anode electrode (anode active material layer) or a cathode electrode (cathode active material layer) of a lithium cell (e.g. lithium-ion cell, lithium-metal cell, or lithium-ion capacitor), a supercapacitor, a non-lithium battery (such as the zinc-air cell, nickel metal hydride battery, sodium-ion cell, and magnesium-ion cell), and other electrochemical energy storage cells, as compared to being directed at the anode active material layer or the cathode active material layer itself.

BACKGROUND

The lithium-metal cell includes the conventional lithium-metal rechargeable cell (e.g. using a lithium foil as the anode and $MnO_2$ particles as the cathode active material), lithium-air cell (Li-Air), lithium-sulfur cell (Li—S), and the emerging lithium-graphene cell (Li-graphene, using graphene sheets as a cathode active material), lithium-carbon nanotube cell (Li-CNT, using CNTs as a cathode), and lithium-nano carbon cell (Li—C, using nano carbon fibers or other nano carbon materials as a cathode). The anode and/or the cathode active material layer can contain some lithium, or can be prelithiated prior to or immediately after cell assembly.

Rechargeable lithium-ion (Li-ion), lithium metal, lithium-sulfur, and Li metal-air batteries are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than conventional lithium-ion batteries (having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries. Even now, cycling stability and safety concerns remain the primary factors preventing the further commercialization of Li metal batteries (e.g. Lithium-sulfur and Lithium-transition metal oxide cells) for EV, HEV, and microelectronic device applications.

Prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1 (with graphite specific capacity <372 mAh/g).

Although lithium-ion (Li-ion) batteries are promising energy storage devices for electric drive vehicles, state-of-the-art Li-ion batteries have yet to meet the cost, safety, and performance targets (such as high specific energy, high energy density, good cycle stability, and long cycle life). Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-170 mAh/g. As a result, the specific energy (gravimetric energy density) of commercially available Li-ion cells featuring a graphite anode and a lithium transition-metal oxide or phosphate based cathode is typically in the range from 120-220 Wh/kg, most typically 150-200 Wh/kg. The corresponding typical range of energy density (volumetric energy density) is from 300 to 400 Wh/L. These specific energy values are two to three times lower than what would be required in order for battery-powered electric vehicles to be widely accepted.

A typical battery cell is composed of an anode current collector, an anode electrode (also referred to as the anode active material layer, typically including an anode active material, a conductive filler, and a binder resin component), an electrolyte/separator, a cathode electrode (also referred to as the cathode active material layer, typically including a cathode active material, a conductive filler, and a binder resin), a cathode current collector, metal tabs that are connected to external wiring, and casing that wraps around all other components except for the tabs. The sum of the weights and the sum of the volumes of these components are the total cell weight and total cell volume, respectively. The total amount of energy stored by a cell is governed by the amount of cathode active material and the corresponding amount of anode active material. The specific energy and energy density of a cell is then defined as the total amount of energy stored by the total cell weight and cell volume, respectively. This implies that one way to maximize the specific energy and energy density of a cell is to maximize the amounts of active materials and to minimize the amounts of all other components (non-active materials), under the constraints of other battery design considerations.

In other words, the current collectors at the anode and the cathode in a battery cell are non-active materials, which must be reduced (in weight and volume) in order to increase the gravimetric and volumetric energy densities of the battery. Current collectors, typically aluminum foil (at the cathode) and copper foil (at the anode), account for about 15-20% by weight and 10-15% by cost of a lithium-ion battery. Therefore, thinner, lighter foils would be preferred. However, there are several major issues associated with state-of-the-art current collectors:

(1) Due to easy creasing and tearing, thinner foils tend to be more expensive and harder to work with.

(2) Due to technical constraints, it is difficult, if not impossible, to fabricate metal foils thinner than 6 μm (e.g. Cu) or thinner than 12 μm (e.g. Al, Ni, stainless steel foil) in mass quantities.

(3) Current collectors must be electrochemically stable with respect to the cell components over the operating potential window of the electrode. In practice, continued corrosion of the current collectors mainly by the electrolyte can lead to a gradual increase in the internal resistance of the battery, resulting in persistent loss of the apparent capacity.

(4) Oxidation of metal current collectors is a strong exothermic reaction that can significantly contribute to thermal runaway of a lithium battery.

Accordingly, the current collectors are crucially important for cost, weight, safety, and performance of a battery. Instead of metals, graphene or graphene-coated solid metal or plastic has been considered as a potential current collector material, as summarized in the references listed below:

1. Li Wang, Xiangming He, Jianjun Li, Jian Gao, Mou Fang, Guangyu Tian, Jianlong Wang, Shoushan Fan, "Graphene-coated plastic film as current collector for lithium/sulfur batteries," J. Power Source, 239 (2013) 623-627.
2. S. J. Richard Prabakar, Yun-Hwa Hwang, Eun Gyoung Bae, Dong Kyu Lee, Myoungho Pyo, "Graphene oxide as a corrosion inhibitor for the aluminum current collector in lithium ion batteries," Carbon, 52 (2013) 128-136.
3. Yang Li, et al. Chinese Patent Pub. No. CN 104600320 A (2015, 05, 06).
4. Zhaoping Liu, et al (Ningbo Institute of Materials and Energy, China), WO 2012/151880 A1 (Nov. 15, 2012).
5. Gwon, H.; Kim, H-S; Lee, K E; Seo, D-H; Park, Y C; Lee, Y-S; Ahn, B T; Kang, K "Flexible energy storage devices based on graphene paper," *Energy and Environmental Science.* 4 (2011) 1277-1283.
6. Ramesh C. Bhardwaj and Richard M. Mank, "Graphene current collectors in batteries for portable electronic devices," US 20130095389 A1, Apr. 18, 2013.

Currently, graphene current collectors come in three different forms: graphene-coated substrate [Ref. 1-4], free-standing graphene paper [Ref. 5], and monolayer graphene film produced by transition metal (Ni, Cu)-catalyzed chemical vapor deposition (CVD) followed by metal etching [Ref. 6].

In the preparation of graphene-coated substrate, small isolated sheets or platelets of graphene oxide (GO) or reduced graphene oxide (RGO) are spray-deposited onto a solid substrate (e.g. plastic film or Al foil). In the graphene layer, the building blocks are separated graphene sheets/platelets (typically 0.5-5 μm in length/width and 0.34-30 nm in thickness) that are typically bonded by a binder resin, such as PVDF [Refs. 1, 3, and 4]. Although individual graphene sheets/platelets can have a relatively high electrical conductivity (within the confine of that 0.5-5 μm), the resulting graphene-binder resin composite layer is relatively poor in electrical conductivity (typically <100 S/cm and more typically <10 S/cm). Furthermore, another purpose of using a binder resin is to bond the graphene-binder composite layer to the substrate (e.g. Cu foil); this implies that there is a binder resin (adhesive) layer between Cu foil and the graphene-binder composite layer. Unfortunately, this binder resin layer is electrically insulating and the resulting detrimental effect seems to have been totally overlooked by prior workers.

Although Prabakar, et al. [Ref. 2] does not seem to have used a binder resin in forming an aluminum foil coated with discrete graphene oxide sheets, this graphene oxide-coated Al foil has its own problem. It is well-known in the art that aluminum oxide ($Al_2O_3$) readily forms on surfaces of an aluminum foil and cleaning with acetone or alcohol is not capable of removing this passivating layer of aluminum oxide or alumina. This aluminum oxide layer is not only electrically and thermally insulating, but actually is not resistant to certain types of electrolyte. For instance, the most commonly used lithium-ion battery electrolyte is $LiPF_6$ dissolved in an organic solvent. A trace amount of $H_2O$ in this electrolyte can trigger a series of chemical reactions that involve formation of HF (a highly corrosive acid) that readily breaks up the aluminum oxide layer and continues to corrode the Al foil and consume electrolyte. The capacity decay typically becomes much more apparent after 200-300 charge-discharge cycles.

Free-standing graphene paper is typically prepared by vacuum-assisted filtration of GO or RGO sheets/platelets suspended in water. In a free-standing paper, the building blocks are separated graphene sheets/platelets that are loosely overlapped together. Again, although individual graphene sheets/platelets can have a relatively high electrical conductivity (within the confine of that 0.5-5 μm), the resulting graphene paper has a very low electrical conductivity; e.g. 8,000 S/m or 80 S/cm [Ref. 5], which is 4 orders of magnitude lower than the conductivity of Cu foil ($8 \times 10^5$ S/cm).

The catalyzed CVD process involves introduction of a hydrocarbon gas into a vacuum chamber at a temperature of 500-800° C. Under these stringent conditions, the hydrocarbon gas gets decomposed with the decomposition reaction being catalyzed by the transition metal substrate (Ni or Cu). The Cu/Ni substrate is then chemically etched away using a strong acid, which is not an environmentally benign procedure. The whole process is slow, tedious, and energy-intensive, and the resulting graphene is typically a single layer graphene or few-layer graphene (up to 5 layers maximum since the underlying Cu/Ni layer loses its effectiveness as a catalyst).

Bhardwaj, et al [Ref. 6] suggested stacking multiple CVD-graphene films to a thickness of 1 μm or a few μm; however, this would require hundreds or thousands of films stacked together (each film being typically 0.34 nm to 2 nm thick). Although Bhardwaj, et al claimed that "The graphene may reduce the manufacturing cost and/or increase the energy density of a battery cell," no experimental data was presented to support their claim. Contrary to this claim, the CVD graphene is a notoriously expensive process and even a single-layer of CVD graphene film would be significantly more expensive than a sheet of Cu or Al foil given the same area (e.g. the same 5 cm×5 cm). A stack of hundreds or thousands of mono-layer or few-layer graphene films as suggested by Bhardwaj, et al would mean hundreds or thousands times more expensive than a Cu foil current collector. This cost would be prohibitively high. Further, the high contact resistance between hundreds of CVD graphene films in a stack and the relatively low conductivity of CVD graphene would lead to an overall high internal resistance, nullifying any potential benefit of using thinner films (1 μm of graphene stack vs. 10 μm of Cu foil) to reduce the overall cell weight and volume. It seems that the patent application of Bhardwaj, et al [Ref. 6], containing no data whatsoever, is nothing but a concept paper.

The above discussions have clearly shown that all three forms of the graphene-enhanced or graphene-based current collector do not meet the performance and cost requirements for use in a battery or supercapacitor. A strong need exists for a different type of material for use as a current collector.

SUMMARY

The present disclosure provides a composite thin film (of conducting polymer network/graphene) current collector for a battery or supercapacitor, the composite thin film comprising graphene sheets dispersed in or bonded by an electron-conducting polymer network (also referred to as conducting network polymer, crosslinked polymer, or hydrogel polymer) wherein the composite thin film has a thickness from 2 nm to 500 μm and an electrical conductivity from $10^{-4}$ to $10^4$ S/cm and wherein the graphene sheets occupy from 10% to 99% by weight and the polymer network from 1% to 90% by weight of the total composite weight.

Preferably, the graphene sheets in the composite thin film are aligned to be substantially parallel to one another and perpendicular to the thickness direction of the composite thin film, or parallel to the thin film plane.

A layer of such a composite thin film alone may be used as a current collector for a battery or supercapacitor. Alternative, one may take a metal foil (e.g. Cu, Al, stainless steel, or Ni foil) and coat one primary surface or both primary surfaces of a metal foil each with such a layer of composite thin film to form a current collector for the anode or cathode of a battery or supercapacitor.

In certain embodiments, the graphene sheets comprise sheets of a graphene material selected from pristine graphene (substantially oxygen-free; containing <0.01% by weight of O), graphene oxide (approximately 1%-50% by weight of O), reduced graphene oxide (approximately 0.01%-1.0%), graphene fluoride, graphene chloride, graphene bromide, graphene iodide, hydrogenated graphene, nitrogenated graphene, doped graphene, chemically functionalized graphene, or a combination thereof. The graphene sheets preferably comprise single-layer graphene or few-layer graphene, wherein a few-layer graphene sheet consists of 2-10 graphene planes.

The electron-conducting polymer network preferably comprises chains of a conjugated polymer selected from polyacetylene, polythiophene, poly(3-alkylthiophenes), polypyrrole, polyaniline, poly(isothianaphthene), poly(3,4-ethylenedioxythiophene), alkoxy-substituted poly(p-phenylene vinylene), poly(2,5-bis(cholestanoxy) phenylene vinylene), poly(p-phenylene vinylene), poly(2,5-dialkoxy) paraphenylene vinylene, poly[(1,4-phenylene-1,2-diphenyl-vinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, or a combination thereof. These polymer chains are a part of a crosslinked network of chains.

Most preferably, the electron-conducting polymer network comprises a polyaniline hydrogel, polypyrrole hydrogel, or polythiophene hydrogel polymer in a dehydrated state.

The present disclosure also provides a current collector that comprises the above-described composite thin film. The current collector preferably comprises a metal tab that is bonded to the composite thin film (e.g. via the conducting network polymer itself) and is used as a terminal pole for connection to an external circuit or load.

Also provided is a current collector, comprising a metal foil having two primary surfaces, wherein at least one of the primary surfaces is chemically bonded with the disclosed composite thin film to form the current collector. The conductive network polymer per se may serve as an adhesive that not only chemically bonds the graphene sheets together to form a composite thin film layer, but also chemically bonds the composite thin film layer to one primary surface or each of the two primary surfaces of a metal foil.

The metal foil is preferably selected from Cu, Ti, Ni, stainless steel, Ti, or Al foil. The surface of the metal foil is preferably free from a passivating layer.

In certain embodiments, metal foil is porous, containing surface pores, interior pores, or through-thickness holes. The metal foil may be simply a sheet of metal foil having punch-through holes, a sheet of metal foam, or a sheet of metal web.

The present disclosure also provides a battery or capacitor using the disclosed composite thin film as a current collector, or a battery or capacitor comprising the composite thin film-coated metal foil as a current collector.

The disclosure also provides a process of producing the disclosed composite thin film, the process comprising: (a) dispersing multiple graphene sheets in a reacting mass comprising an oligomer or a monomer, an initiator or catalyst, a curing or cross-linking agent, and/or a liquid solvent to form a reacting suspension (not all the listed ingredients have to be present; only need those ingredients that result in a crosslinked conducting polymer network); (b) depositing a wet layer of the reacting suspension onto at least one of the two primary surfaces of a solid substrate; and (c) polymerizing or crosslinking the reacting suspension and at least partially removing any liquid or unreacted ingredients to form the composite thin film supported by the solid substrate.

Sub-process (b) of depositing preferably comprises a procedure selected from casting, coating, printing, spraying, painting, extrusion, or a combination thereof. Coating may be selected from slot-die coating, comma coating, reverse-roll coating, dipping coating, micro-gravure coating, ultra-spraying coating. Printing may be selected from screen printing, inkjet printing, gravure printing, etc.

In certain embodiments, the composite thin film has a layer thickness from 2 nm to 100 nm and the solid substrate comprises a metal foil having a thickness from 1 μm to 30 μm. In these cases, this composite thin film, comprising graphene sheets and a conducting polymer network, serves as a protecting layer for the underlying metal foil. The metal foil is preferably bonded with such a composite thin film on each of the two primary surfaces.

In some embodiments, the solid substrate comprises a metal foil selected from Cu, Ti, Ni, stainless steel, Ti, or Al foil. These metal foils are commonly used current collectors. The surfaces of these metal foils may be pre-coated with a thin layer of carbon (e.g. amorphous carbon or CVD carbon).

In certain embodiments, the solid substrate comprises a metal foil and the process further comprises a procedure of chemically etching a surface of the metal foil to remove a surface-borne passivating layer prior to (b).

In some preferred embodiments, (b) and (c) include depositing and forming a layer of the composite thin film on each of the two primary surfaces of the solid substrate. Again, the solid substrate may comprise a metal foil that is porous, containing surface pores, interior pores, or through-thickness holes.

The process is preferably a roll-to-roll or reel-to-reel process, wherein (b) and (c) include feeding a continuous sheet of the solid substrate from a roller to a deposition zone, depositing a wet layer of the reacting suspension onto the at least one primary surface of the solid substrate, polymerizing or crosslinking the reacting suspension to form a composite film, and collecting the composite film on a collector roller.

In certain embodiments, the solid substrate in the process is selected from a sheet, film, or block of a glass, ceramic, plastic, rubber, or metal and the process further comprises peeling off the composite thin film from the solid substrate to obtain a free-standing composite thin film. This composite thin film may then be cut into one or a plurality of layers for incorporation as current collectors in batteries or supercapacitors.

Preferably, (b) of depositing comprises subjecting the reacting suspension to a shear stress and/or conducting (c) of polymerizing or crosslinking the reacting suspension under compression to align the graphene sheets to be substantially parallel to one another.

DETAILED DESCRIPTION OF PREFERRED EMBODIMENTS

Figure 2A:
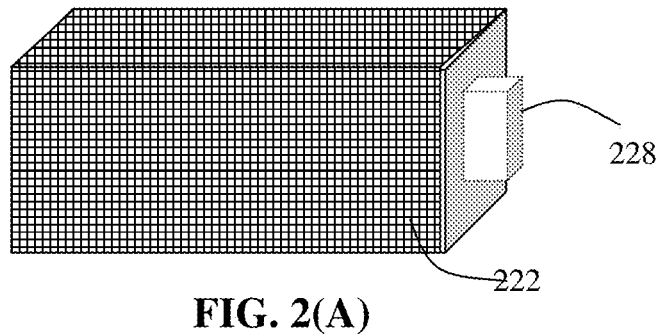
FIG. 2(A) Schematic drawing illustrating a free-standing graphene/conducting network polymer composite film that can be used as a current collector.

The present disclosure provides a composite thin film (of conducting polymer network/graphene) current collector for a battery or supercapacitor. In some embodiments, as illustrated in FIG. 2(A), the composite thin film 222 comprises graphene sheets dispersed in or bonded by an electron-conducting polymer network (also referred to as conducting network polymer, crosslinked polymer, or hydrogel polymer) wherein the composite thin film has a thickness from 2 nm to 500 μm and an electrical conductivity from $10^{-4}$ to $10^4$ S/cm and wherein the graphene sheets occupy from 10% to 99% by weight and the polymer network from 1% to 90% by weight of the total composite weight. A metal tab 228, for use as a terminal pole to be connected to an external load or circuit, may be optionally embedded into this composite film 222 or bonded to this composite film.

In certain embodiments, a layer of such a composite thin film alone may be used as a current collector for a battery or supercapacitor. In other alternative embodiments, one may take a metal foil (e.g. Cu, Al, stainless steel, or Ni foil) and coat one primary surface or both primary surfaces of a metal foil each with such a layer of composite thin film to form a current collector for the anode or cathode of a battery or supercapacitor. Schematically shown in FIG. 2(C) is a current collector that comprises a graphene/conductive network polymer composite film 212 bonded to a primary surface of a metal foil 214. A metal tab 218 is integral to this metal foil 214. An extremely thin layer of the conducting network polymer alone 216 may be naturally present (without graphene sheets) that helps bond the composite film 212 to the metal foil 214.

The thin metal foil (214 in FIG. 2(C)) preferably has a thickness from 1 μm to 30 μm (more preferably from 4 to 12 μm) and two opposed but substantially parallel primary surfaces. FIG. 2(C) only shows one primary surface of the metal foil 214 being bonded with a composite thin film 212. However, preferably, the opposite primary surface is also bonded with a composite thin film. As a terminal pole for electrically connecting to an external circuit, a metal tab 218 is typically welded or soldered to the metal foil 214.

As illustrated in FIG. 2(C), a preferred embodiment of the present disclosure is a graphene/conducting network polymer composite-bonded metal foil current collector, wherein no non-conductive binder resin layer and no passivating layer (e.g. aluminum oxide layer) is present between the composite film and the Cu foil or Al foil.

The electron-conducting polymer network preferably comprises chains of a conjugated polymer selected from polyacetylene, polythiophene, poly(3-alkylthiophenes), polypyrrole, polyaniline, poly(isothianaphthene), poly(3,4-ethylenedioxythiophene), alkoxy-substituted poly(p-phenylene vinylene), poly(2,5-bis(cholestanoxy) phenylene vinylene), poly(p-phenylene vinylene), poly(2,5-dialkoxy) paraphenylene vinylene, poly[(1,4-phenylene-1,2-diphenyl-vinylene)], poly(3',7'-dimethyloctyloxy phenylene vinylene), polyparaphenylene, polyparaphenylene, polyparaphenylene sulphide, polyheptadiyne, poly(3-hexyl-thiophene), poly(3-octylthiophene), poly(3-cyclohexylthi-ophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, or a combination thereof. These conducting network polymers typically have an electronic conductivity from $10^{-8}$ S/cm (un-doped) to $10^{+1}$ S/cm (doped) more typically from $10^{-4}$ S/cm to 1 S/cm. These conducting polymers have not been known to have any adhesive or binding power, however.

Most preferably, the electron-conducting polymer network comprises a polyaniline hydrogel, polypyrrole hydrogel, or polythiophene hydrogel polymer in a dehydrated state.

Figure 2B:
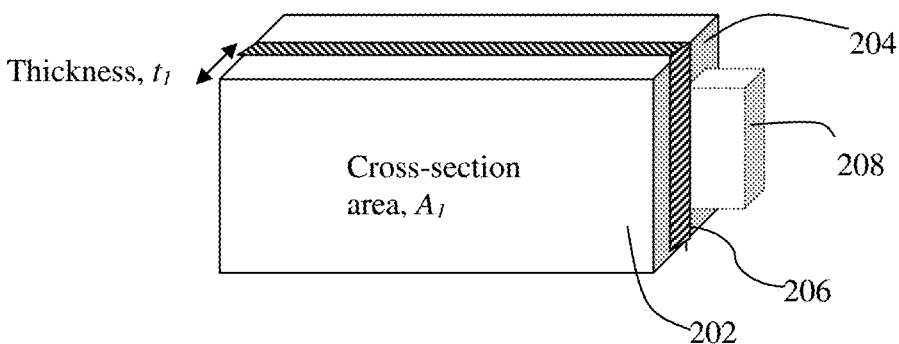
FIG. 2(B) Schematic drawing illustrating the prior art graphene-coated metal foil current collector, wherein a binder resin layer (or passivating aluminum oxide layer) is present between the graphene layer and the metal foil, such as Cu foil (or Al foil).
Figure 2C:
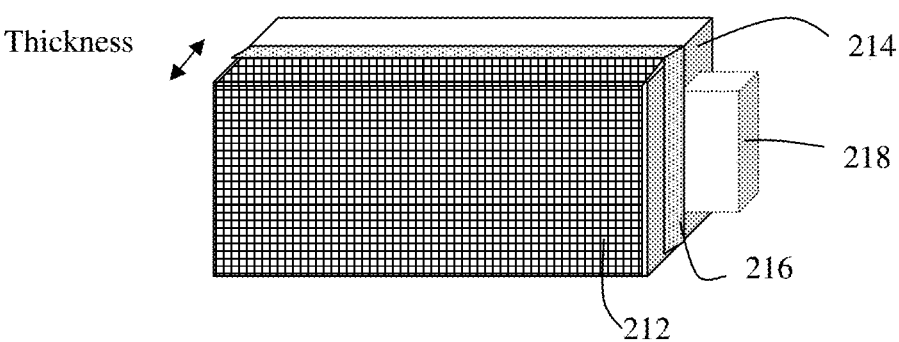
FIG. 2(C) Schematic drawing illustrating a preferred graphene/conducting network polymer-bonded metal foil current collector, wherein no passivating aluminum oxide layer is present between the composite film and the Cu foil or Al foil.

In contrast, as schematically illustrated in FIG. 2(B), the prior art graphene-coated metal foil current collector typically and necessarily requires a binder resin layer (non-conducting epoxy or polyurethane) between the graphene layer (a graphene-resin composite) and the metal foil (e.g. Cu foil). In the case of prior art graphene-coated Al foil [Prabakar et al.; Ref. 2], a passivating aluminum oxide (alumina) layer is naturally present between the graphene layer and the Al metal foil. This is due to the well-known fact that aluminum foil, upon fabrication and exposure to room air, always forms a passivating aluminum oxide layer on the surfaces of the Al foil. Simple cleaning by acetone or alcohol is incapable of removing this alumina layer. As will be demonstrated in later paragraphs, the presence of a layer of non-conductive binder resin or aluminum oxide, even as thin as just 1 nm, has an enormous effect on increasing the contact resistance between the graphene layer and the metal foil. This surprising discovery by us has been totally overlooked by all prior art workers and, hence, prior art graphene-coated metal foils have not met the performance and cost requirements of a lithium battery or supercapacitor current collector.

The disclosure also provides a process of producing the disclosed composite thin film, the process comprising: (a) dispersing multiple graphene sheets in a reacting mass comprising an oligomer or a monomer, an initiator or catalyst, a curing or cross-linking agent, and/or a liquid solvent to form a reacting suspension (not all the listed ingredients have to be present; only need those ingredients that result in a crosslinked conducting polymer network); (b) depositing a wet layer of the reacting suspension onto at least one of the two primary surfaces of a solid substrate; and (c) polymerizing or crosslinking the reacting suspension and at least partially removing any liquid or unreacted ingredients to form the composite thin film supported by the solid substrate.

Sub-process (b) of depositing preferably comprises a procedure selected from casting, coating, printing, spraying, painting, extrusion, or a combination thereof. Coating may be selected from slot-die coating, comma coating, reverse-roll coating, dipping coating, micro-gravure coating, ultrasonic-spraying coating. Printing may be selected from screen printing, inkjet printing, gravure printing, etc.

Preferably, the metal foil preferably has a thickness from 1 μm to 30 μm. The micro-gravure coater (sometimes referred to as a micro-gravure printer) is one of very few devices that are capable of coating nano materials to a thickness less than 20 nm, for instance. Ultrasonic spraying is capable of producing ultra-thin coating layers, but the thickness-building process can be slow.

Figure 3:
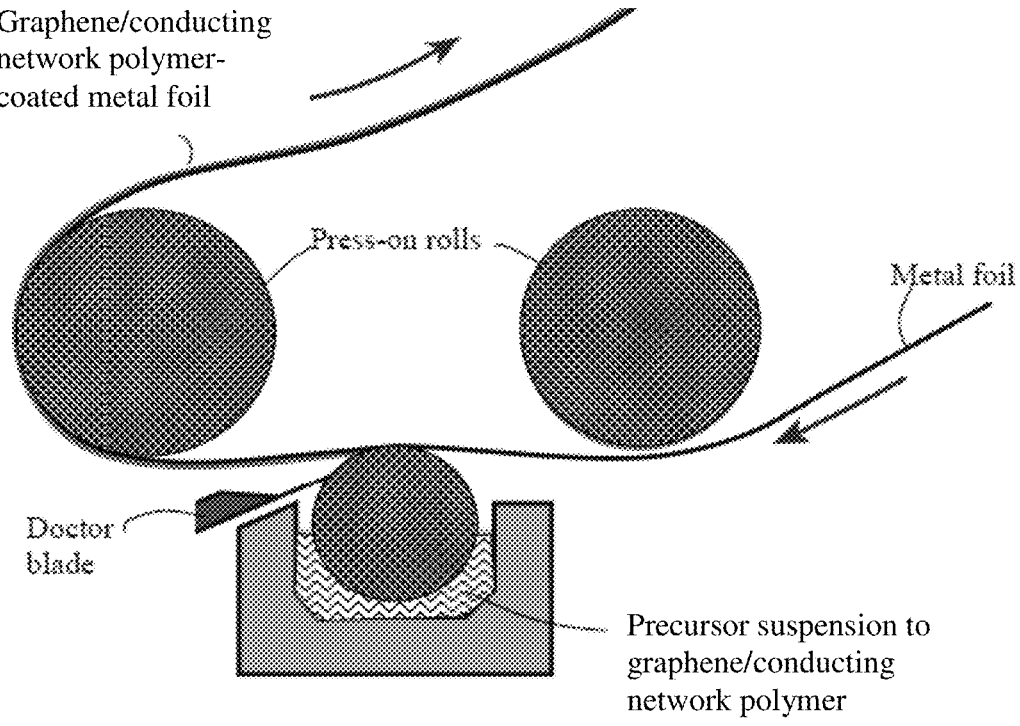
FIG. 3 Schematic of a micro-gravure apparatus, according to some embodiments of the present disclosure. Micro-gravure is one of many coating systems that can be used to produce composite thin films from a reacting mass of graphene sheets and polymer precursor solution.
Figure 4:
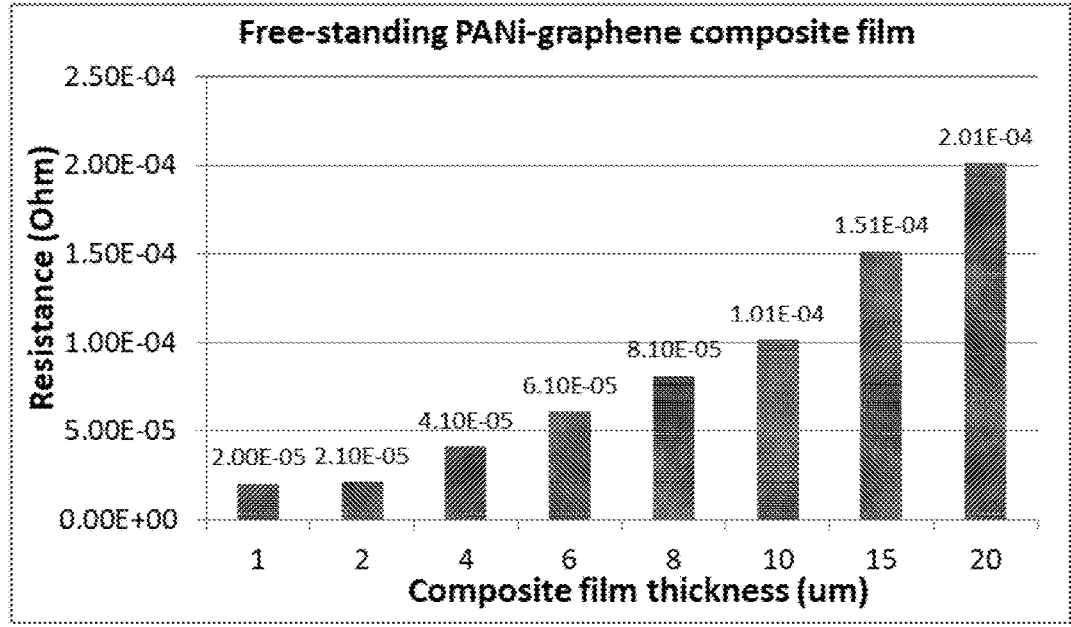
FIG. 4 Electric resistance of free-standing composite films of graphene sheets dispersed in or bonded by a conducting polymer network, plotted as a function of the film thickness.

Compared to a gravure coater and other roll-to-roll coating systems, a micro-gravure coater (or printer) has a smaller diameter gravure roll engraved with patterns or cells to provide a specific coating volume. As schematically illustrated in FIG. 3, this coater or printer is used in a reverse kiss coating method in which the roll is partially submerged in a pan of solution or suspension. The roll rotates in the opposite direction of the web, and the cells pick up the coating solution or suspension. The flexible doctor blade can lightly smooth off the excess suspension and the precisely measured suspension in the cells is then transferred to the web.

The smaller diameter provides a much smaller contact area, which allows for a stable bead of suspension that is critical for thin and uniform coatings. The larger web-to-roller distance minimizes streaks and offers cleaner lines. No backing roll (no creasing) and smaller contact area are the features that can prevent spillover to the other side. Reverse coating creates shearing which results in a high degree of graphene sheet orientation, aligned along a desired direction.

In certain embodiments, the graphene sheets comprise sheets of a graphene material selected from pristine graphene (substantially oxygen-free; containing <0.01% by weight of O), graphene oxide (approximately 1%-50% by weight of O), reduced graphene oxide (approximately 0.01%-1.0%), graphene fluoride, graphene chloride, graphene bromide, graphene iodide, hydrogenated graphene, nitrogenated graphene, doped graphene, chemically functionalized graphene, or a combination thereof. We have also observed that the micro-gravure equipment is also capable of creating the required shear stress to align the graphene sheets of all kinds of graphene materials, including from pristine graphene, graphene oxide, reduced graphene oxide, graphene fluoride, graphene chloride, graphene bromide, graphene iodide, hydrogenated graphene, nitrogenated graphene, doped graphene, and chemically functionalized graphene.

In the cases of aluminum foil-based current collectors or other metal surfaces having a tendency to form a passivating layer (typically metal oxide or metal hydroxide), the disclosed process preferably further include a procedure of chemically etching off the passivating layer (e.g. aluminum oxide layer) prior to being coated with or bonded by the composite thin film of graphene/conducting network polymer.

Now, let us take a closer look at the magnitude of the total resistance (including the contact resistance) in a three-layer structure as illustrated in FIG. 2(B). The electrons in the graphene layer 202 (Layer 1) must move around in this layer, move across through the binder resin or passivating alumina layer 206 (Layer 2), and then move in the metal foil layer 204 (Layer 3) toward the terminal tab 208. For simplicity, we will consider only the total resistance against the electrons moving across the thickness of the graphene layer, the thickness of the binder/passivating layer, and the thickness of the metal foil layer. The electron movement in both the in-plane directions of graphene or metal foil is fast and of low resistance; hence, this resistance is neglected in the instant calculation.

The thickness-direction resistance of a sheet/film of conductor is given by $R=(1/\sigma)$ $(t/A)$, where $A$=cross-section (length×width) of the conductor, $t$=thickness of the conductor, $\sigma$=conductivity=$1/\varrho$, and $\varrho$=resistivity, a material constant. A graphene-coated current collector containing a binder or passivating metal oxide layer may be viewed as a three-layer structure (FIG. 2(B)) with the graphene film, interfacial binder resin layer (or passivating alumina layer), and metal foil layer electrically connected in series.

The total resistance is the sum of the resistance values of the three layers: $R=R_1+R_2+R_3=\rho_1(t_1/A_1)+\rho_2(t_2/A_2)+\rho_3(t_3/A_3)=(1/\sigma_1)(t_1/A_1)+(1/\sigma_2)(t_2/A_2)+(1/\sigma_3)(t_3/A_3)$, where $\rho$=resistivity, $\alpha$=conductivity, $t$=thickness, and $A$=area of a layer, and, approximately, $A_1=A_2=A_3$. Scanning electron microscopic examinations reveal that the binder resin or passivating alumina layers are typically 5-100 nm thick. The resistivity of most commonly used binder resin (PVDF) and that of alumina ($Al_2O_3$) are typically in the range from $10^{13}$-$10^{15}$ ohm-cm. Assume that $A_1=A_2=A_3=1$ $cm^2$, the thickness-direction resistivity $\rho_1$ of graphene layer=0.1 ohm-cm, the binder or alumina layer resistivity $\rho_2=1\times10^{14}$ ohm-cm and the metal foil layer resistivity is $\rho_3=1.7\times10^{-6}$ ohm-cm (Cu foil), or $\rho_3=2.7\times10^{-6}$ ohm-cm (Al foil). Also assume the optimum conditions where the Cu or Al foil thickness=6 μm, graphene layer thickness=1 μm, and binder resin layer thickness is only 0.5 nm (actually it is from 5 nm to 100 nm). Then, the total resistance of the three-layer structure would be $5\times10^6$ ohm and the overall conductivity would be as low as $1.4\times10^{-10}$ S/cm (see first data row in Table 1 below). If we assume that the binder resin layer is 10 nm thick, the total resistance of the three-layer structure would be $1\times10^8$ ohm and the overall conductivity would be as low as $7.0\times10^{-12}$ S/cm (see 4th data row in Table 1 below). Such a 3-layer composite structure would not be a good current collector for a battery or supercapacitor since a high internal resistance would mean a low output voltage, lower power, and high amount of internal heat generated. Similar results are observed for Ni, Ti, and stainless steel foil-based current collectors (data rows 7-10 of Table 1).

TABLE 1

| metal | $\rho_1$ ohm-cm | $t_1$ $10^{-4}$ cm | $A_1$ cm$^2$ | $\rho_2$ ohm-cm | $t_2$ $10^{-4}$ cm | $A_2$ cm$^2$ | $\rho_3$ ohm-cm | $t_3$ $10^{-4}$ cm | $A_3$ cm$^2$ | R ohm | $\sigma =$ t/(AR) S/cm |
|---|---|---|---|---|---|---|---|---|---|---|---|
| Cu | 0.1 | 1 | 1 | 1.00E+14 | 0.0005 | 1 | 1.70E−06 | 6 | 1 | 5.00E+06 | 1.40E−10 |
| Cu | 0.1 | 1 | 1 | 1.00E+14 | 0.001 | 1 | 1.70E−06 | 6 | 1 | 1.00E+07 | 7.00E−11 |
| Cu | 0.1 | 1 | 1 | 1.00E+14 | 0.005 | 1 | 1.70E−06 | 6 | 1 | 5.00E+07 | 1.40E−11 |
| Cu | 0.1 | 1 | 1 | 1.00E+14 | 0.01 | 1 | 1.70E−06 | 6 | 1 | 1.00E+08 | 7.01E−12 |
| Cu | 0.1 | 1 | 1 | 1.00E+14 | 0.001 | 1 | 1.70E−06 | 6 | 1 | 1.00E+07 | 7.00E−11 |
| Al | 0.1 | 1 | 1 | 1.00E+14 | 0.001 | 1 | 2.70E−06 | 6 | 1 | 1.00E+07 | 7.00E−11 |
| Ni | 0.1 | 1 | 1 | 1.00E+14 | 0.001 | 1 | 7.00E−06 | 6 | 1 | 1.00E+07 | 7.00E−11 |
| Ti | 0.1 | 1 | 1 | 1.00E+14 | 0.001 | 1 | 5.50E−05 | 6 | 1 | 1.00E+07 | 7.00E−11 |
| SS304 | 0.1 | 1 | 1 | 1.00E+14 | 0.001 | 1 | 7.20E−05 | 6 | 1 | 1.00E+07 | 7.00E−11 |

In contrast, if there is no passivating alumina layer and the binder resin is now a conducting network polymer (using polyaniline hydrogel as an example, having an electrical conductivity of 0.1 S/cm or resistivity of 10 ohm-cm), according to one of the embodiments of the presently disclosed current collector (FIG. 2(C)), the total resistance of a graphene/PANi-bonded Cu foil has a value of $2.0 \times 10^{-5}$ ohm (vs. $1.0 \times 10^{+7}$ ohm of a 3-layer structure containing a 10-nm binder resin layer). Please see Table 2 below. This represents a difference by more than 11 orders of magnitude (not 11-fold)! The conductivity would be $3.5 \times 10^{+1}$ S/cm for the instant 3-layer structure, in contrast to $7.0 \times 10^{-12}$ S/cm of the corresponding 3-layer structure containing an electrically insulating layer. Again, the difference is by 11 orders of magnitude. Furthermore, we have discovered that the lithium batteries and supercapacitors featuring the presently invented graphene/conducting network polymer-bonded metal foil current collectors always exhibit a higher voltage output, higher energy density, higher power density, more stable chare-discharge cycling response, and last longer without capacity decay or corrosion issues as compared to prior art graphene-based current collectors Since graphene sheets are an essential material in the presently disclosed graphene-enabled current collector, the production processes used to produce various different types of graphene sheets are herein briefly introduced and discussed.

Bulk natural flake graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

TABLE 2

| | Graphene/PANi | | | PANi Binder | | | Metal foil | | | | |
|---|---|---|---|---|---|---|---|---|---|---|---|
| | $\rho1$ ohm-cm | t1 $10^{-4}$ cm | A1 cm$^2$ | $\rho2$ ohm-cm | t2 $10^{-4}$ cm | A2 cm$^2$ | $\rho3$ ohm-cm | t3 $10^{-4}$ cm | A3 cm$^2$ | R ohm | $\sigma =$ t/(AR) S/cm |
| Cu | 0.1 | 1 | 1 | 1.00E+01 | 0.0005 | 1 | 1.70E−06 | 6 | 1 | 1.05E−05 | 6.67E+01 |
| | 0.1 | 1 | 1 | 1.00E+01 | 0.001 | 1 | 1.70E−06 | 6 | 1 | 1.10E−05 | 6.36E+01 |
| | 0.1 | 1 | 1 | 1.00E+01 | 0.005 | 1 | 1.70E−06 | 6 | 1 | 1.50E−05 | 4.67E+01 |
| | 0.1 | 1 | 1 | 1.00E+01 | 0.01 | 1 | 1.70E−06 | 6 | 1 | 2.00E−05 | 3.50E+01 |
| Cu | 0.1 | 1 | 1 | 1.00E+01 | 0.001 | 1 | 1.70E−06 | 6 | 1 | 1.10E−05 | 6.36E+01 |
| Al | 0.1 | 1 | 1 | 1.00E+01 | 0.001 | 1 | 2.70E−06 | 6 | 1 | 1.10E−05 | 6.36E+01 |
| Ni | 0.1 | 1 | 1 | 1.00E+01 | 0.001 | 1 | 7.00E−06 | 6 | 1 | 1.10E−05 | 6.36E+01 |
| Ti | 0.1 | 1 | 1 | 1.00E+01 | 0.001 | 1 | 5.50E−05 | 6 | 1 | 1.10E−05 | 6.35E+01 |
| SS304 | 0.1 | 1 | 1 | 1.00E+01 | 0.001 | 1 | 7.20E−05 | 6 | 1 | 1.10E−05 | 6.34E+01 |

In another embodiment of the present disclosure where a free-standing layer of conducting network polymer/graphene composite, without a supporting metal foil, is implemented as a current collector (FIG. 2(A)), the resistance of the composite layer is from $2 \times 10^{-5}$ ohm to $2 \times 10^{-4}$ ohm, depending upon the thickness of the composite layer (FIG. 3). This is again based on polyaniline hydrogel network polymer as an example, having an electrical conductivity of approximately 0.1 S/cm. The total resistance in the presently disclosed thin film composite is 11-12 orders of magnitude lower than those of a conventional graphene-coated metal foil having an non-conducting binder resin and/or a passivating layer on a metal surface.

The constituent graphene planes (typically 30 nm-2 μm wide/long) of a graphite crystallite can be exfoliated and extracted or isolated from the graphite crystallite to obtain individual graphene sheets of carbon atoms provided the inter-planar van der Waals forces can be overcome. An isolated, individual graphene sheet of hexagonal carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets or NGPs are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574 now abandoned); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152 now abandoned).

Figure 1:
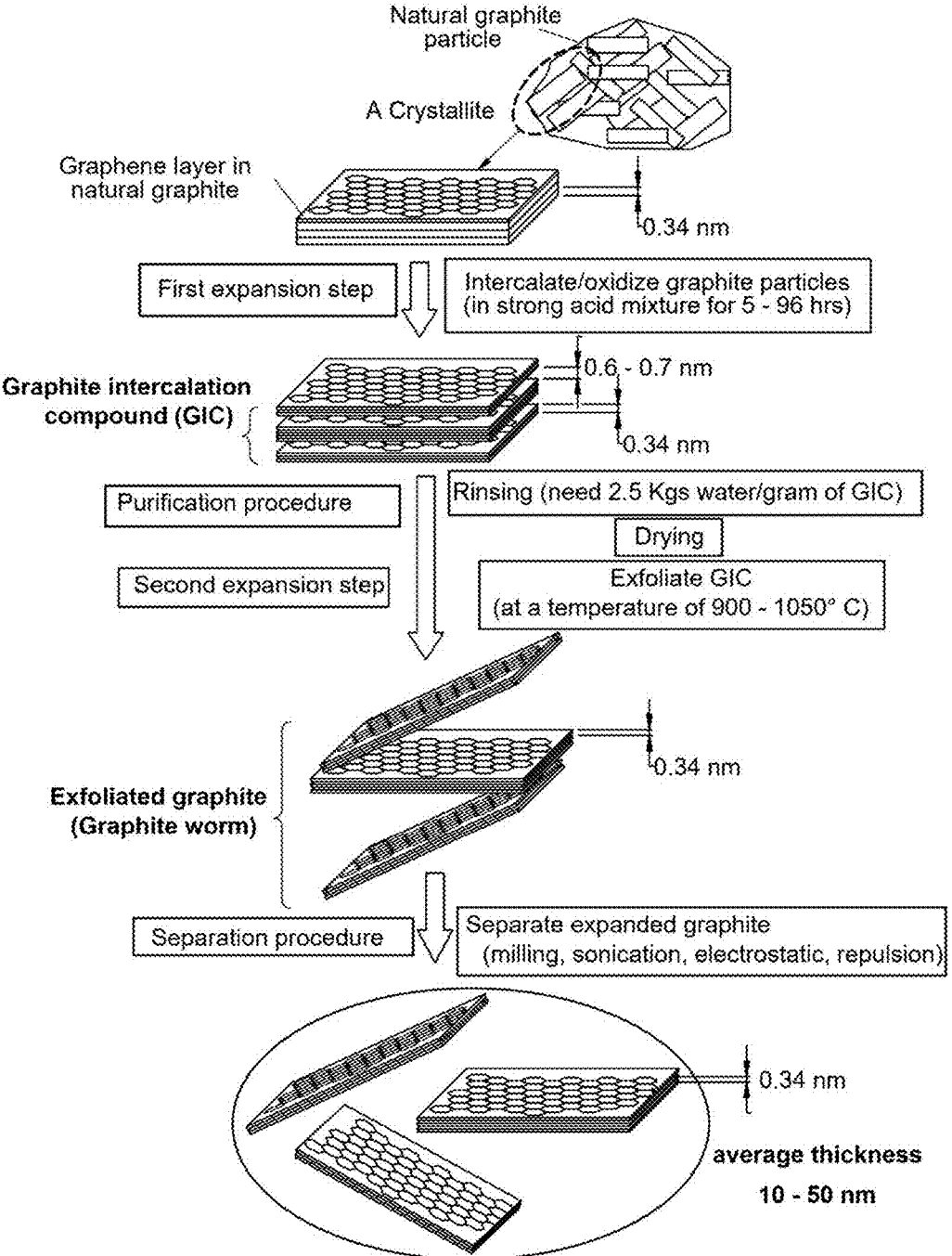
FIG. 1 Schematic drawing illustrating the commonly used process for producing graphene sheets. The process begins with intercalation and/or oxidation treatment of graphitic materials (e.g. natural graphite particles).

A highly useful approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

It may be noted that if natural graphite powder is dispersed in an oxidant (e.g., a mixture of concentrated sulfuric acid and nitric acid or potassium permanganate) for a sufficient period of time one can obtain a GO material having an oxygen content greater than 30% by weight (preferably >35%), which can be formed into a GO gel state via water rinsing and mechanical shearing.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. $Na_4B$) may be added to obtain reduced graphene oxide (RGO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

Graphene materials can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS). When the oxygen content of graphene oxide exceeds 30% by weight (more typically when >35%), the GO molecules dispersed or dissolved in water for a GO gel state.

The laminar graphite materials used in the prior art processes for the production of the GIC, graphite oxide, and subsequently made exfoliated graphite, flexible graphite sheets, and graphene platelets were, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. *"Halogenated Graphenes: Rapidly Growing Family of Graphene Derivatives"* ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine $(F_2)$, other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene can contain pristine or non-pristine graphene and the invented method allows for this flexibility. These graphene sheets all can be chemically functionalized.

The present disclosure also provides a rechargeable battery that contains a presently invented graphene thin film-bonded metal foil as an anode current collector and/or a cathode current collector. This can be any rechargeable battery, such as a zinc-air cell, a nickel metal hydride cell, a sodium-ion cell, a sodium metal cell, a magnesium-ion cell, or a magnesium metal cell, just to name a few. This invented battery can be a rechargeable lithium battery containing the unitary graphene layer as an anode current collector or a cathode current collector, which lithium battery can be a lithium-sulfur cell, a lithium-selenium cell, a lithium sulfur/selenium cell, a lithium-ion cell, a lithium-air cell, a lithium-graphene cell, or a lithium-carbon cell. Another embodiment of the disclosure is a capacitor containing the current collector of the present disclosure as an anode current collector or a cathode current collector, which capacitor is a symmetric ultracapacitor, an asymmetric ultracapacitor cell, a hybrid supercapacitor-battery cell, or a lithium-ion capacitor cell As an example, the present disclosure provides a rechargeable lithium-metal cell composed of a current collector at the anode, a lithium film or foil as the anode, a porous separator/electrolyte layer, a cathode containing a cathode active material (e.g. lithium-free $V_2O_5$ and $MnO_2$), and a current collector. Either or both the anode current collector and cathode current collector can be a graphene-based current collector of the present disclosure.

Another example of the present disclosure is a lithium-ion capacitor (or hybrid supercapacitor) composed of a current collector at the anode, a graphite or lithium titanate anode, a porous separator soaked with liquid or gel electrolyte, a cathode containing a cathode active material (e.g. activated carbon having a high specific surface area), and a current collector. Again, either or both the anode current collector and cathode current collector can be a graphene-based current collector of the present disclosure.

Yet another example of the present disclosure is another lithium-ion capacitor or hybrid supercapacitor, which is composed of a current collector at the anode, a graphite anode (and a sheet of lithium foil as part of the anode), a porous separator soaked with liquid electrolyte, a cathode containing a cathode active material (e.g. activated carbon having a high specific surface area), and a current collector. Again, either or both the anode current collector and cathode current collector can be a graphene-based current collector of the present disclosure.

Still another example of the present disclosure is a lithium-graphene cell composed of a current collector at the anode, a porous, nano-structured anode (e.g. comprising graphene sheets having high surface areas upon which returning lithium ions can deposit during cell recharge, which are mixed with surface-stabilized lithium powder particles, or having a sheet of lithium foil attached to the nano-structure), a porous separator soaked with liquid electrolyte, a cathode containing a graphene-based cathode active material (e.g. graphene, graphene oxide, or graphene fluoride sheets having high specific surface areas to capture lithium ions during cell discharge), and a cathode current collector. Again, either or both the anode current collector and cathode current collector can be a graphene-based current collector of the present disclosure.

Example 1: Preparation of Discrete Graphene Sheets (NGPs) and Graphene/Conducting Polymer Composite-Coated Metal Foils Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) was subjected to a thermal shock at 1050° C. for 45 seconds in a tube furnace to form exfoliated graphite (or graphite worms).

Five grams of the resulting exfoliated graphite (graphite worms) were mixed with 2,000 ml alcohol solution consisting of alcohol and distilled water with a ratio of 65:35 for 12 hours to obtain a suspension. Then the mixture or suspension was subjected to ultrasonic irradiation with a power of 200 W for various times. After two hours of sonication, EG particles were effectively fragmented into thin graphene sheets.

Graphene sheets were mixed with a binder resin (PVDF) and a reacting precursor to polyaniline hydrogel (procedure explained in Example 9), respectively. The resulting suspensions were then slot die-coated onto primary surfaces of Cu foil and Al foil to form graphene oxide-coated current collectors and conductive network polymer/graphene composite-coated current collectors, respectively. The resulting current collectors were evaluated in both lithium batteries and supercapacitors.

Example 2: Preparation of Graphene from Meso-Carbon Micro-Beads (MCMBs) and Graphene/Conducting Network Polymer Composite-Protected Metal Foil Meso-carbon microbeads (MCMBs) were supplied from China Steel Chemical Co. This material has a density of about 2.24 $g/cm^3$ with a median particle size of about 16 μm. MCMB (10 grams) were intercalated with an acid solution (sulfuric acid, nitric acid, and potassium permanganate at a ratio of 4:1:0.05) for 72 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 1,080° C. for 45 seconds to obtain a graphene material. TEM and atomic force microscopic studies indicate that most of the NGPs were single-layer graphene.

A desired amount of these graphene sheets were mixed with a pyrrole-based reactive mass to form a reactive suspension and cast onto a surface of a glass substrate. Upon completion of the polymerization and crosslinking procedure, the composite thin film was peeled off from the glass surface to make a free-standing layer of current collector. On a separate basis, the same composite film was deposited onto a surface of n Al foil (pre-etched with HCl solution to remove the alumina passivating layer) using a micro-gravure device.

Example 3: Preparation of Pristine Graphene Sheets and Graphene/Conducting Network Polymer Composite Film-Protected Current Collectors In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. These pristine graphene sheets were then dispersed in the precursor solution (PEDOT/PSS dissolved in water) to form a reactive suspension, which was then deposited onto a thin Cu foil (8 μm thick) using a comma coater.

Example 4: Preparation of Graphene Fluoride Sheet/Conducting Polymer Network Composite-Protected Current Collectors Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in aniline-based reactive mass to form a suspension. The suspension was then coated on a PET film substrate surface using a comma coater, dried, and peeled off from the substrate to form a free-standing graphite fluoride/PANi composite film.

Example 5: Preparation of Nitrogenated Graphene/Conducting Network Polymer Composite Current Collectors Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water. The resulting dispersion was mixed with a pyrrole-based reacting mass (Example 8) and gravure-coated on one primary surface of a roll of Al foil to produce graphene/conducting polymer network composite-coated Al current collectors.

Example 6: Functionalized Graphene/Conducting Polymer Composite-Coated Conductive Foils Composite films were prepared from several functionalized graphene-analine dispersions containing 5% by weight of functionalized graphene sheets (few-layer graphene) and 0.01% by weight of aniline oligomer in water. Chemical functional groups involved in this study include an azide compound (2-Azidoethanol), alkyl silane, hydroxyl group, carboxyl group, amine group, sulfonate group (—SO₃H), and diethylenetriamine (DETA). These functionalized graphene sheets were supplied from Taiwan Graphene Co., Taipei, Taiwan. Upon coating of the dispersion onto two surfaces of Cu foil and stainless steel foil, removal of the liquid medium (acetone), compressed with a heated press and cured at 35° C. for 45 minutes, one obtained functionalized graphene/PANi-coated current collectors wherein graphene sheets were well bonded to urethane based adhesive.

Example 7: Production of PEDOT:PS/Graphene Composite Films

Poly(3,4-ethylenedioxythiophene):polystyrene sulfonate (PEDOT:PSS) is a polymer mixture of two ionomers. One component is made up of sodium polystyrene sulfonate, which is a sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt. The PEDOT/PSS is soluble in water.

Desired amounts of the graphene sheets were then dispersed in a PEDOT/PSS-water solution to form a slurry (5% by wt. solid content), which was ultrasonic-spray coated onto a glass surface to form a composite thin.

Example 8: Preparation of Conductive Polymer Networks

Polypyrrole networks (cross-linked PPy or PPy hydrogels) were prepared via a two-reactant, one-pot process. Pyrrole (>97% purity) was dissolved in a solvent of water/ethanol (1:1 by weight) to achieve the first reactant having a concentration of 0.209 mol/L.

Then, as the second reactant, aqueous solutions of ferric nitrate $(Fe(NO_3)_3.9H_2O)$ and ferric sulphate, respectively, were made at concentrations of 0.5 mol/L. Subsequently, polymerization of the network gels was carried out in an ice bath at 0° C., by mixing volumes of the two reactants at 1:1 molar ratios of pyrrole:ferric salt, to create a reacting mixture with a total of 4 mL. A desired amount of graphene sheets was dispersed in this reacting mixture. After rigorously stirring for 1 minutes, the slurry mass was allowed to stand and polymerization and gelation began after 5 minutes. A pyrrole:ferric salt molar ratio of 1:1, which is stoichiometrically deficient of ferric salt, leads to secondary growth (cross-linking) of the polypyrrole network, which could continue from 1 day to 30 days to produce cohesive hydrogels of high elasticity upon removal of the liquid phase (water and ethanol).

In a separate experiment, additional reactants were added after mixing but prior to gelation. These additional reactants (each referred to as a third reactant), including phytic acid, ferric nitrate, ferric sulphate, potassium hydroxide, and sodium hydrogen carbonate, were separately dissolved in water to form solutions at 1 mmo/L concentration. These reactants were added to separate mixtures of polypyrrole created earlier with ferric nitrate. It was found that the most elastic hydrogels could be obtained at ratios of 1 milli-mole of third reactant-to-1 mole pyrrole. After 30 days, the gels were washed with deionized water until pH neutral to remove any excess $Fe^{3+}$, unreacted pyrrole, $H^+$ ions (produced during polymerization), and unbonded cross-linking chemicals.

Example 9: Production of Polyaniline Gel Network/Graphene Composite Films

The precursor of a conducting network polymer, such as crosslinkable polyaniline and polypyrrole, may contain a monomer, an initiator or catalyst, a crosslinking or gelating agent, an oxidizer and/or dopant. As an example, 3.6 ml aqueous solution A, which contains 400 mM aniline monomer and 120 mM phytic acid, was added and mixed with 280 mg graphene sheets. Subsequently, 1.2 ml solution B, containing 500 mM ammonium persulfate was added into the above mixture and subjected to bath sonication for 1 min. The resulting reactive suspension was cast onto a glass surface. In about 5 min, the solution changed color from brown to dark green and became viscous and gel-like, indicating in-situ polymerization of aniline monomer to form the PANi hydrogel. The resulting film was cured at 50° C. for 2 hours to obtain a PANi network polymer-/graphene composite film.

Example 10: Heparin-Based Material as a Curing Agent for the Preparation of a Conducting Polymer Network The conducting polymer may be produced from a monomer using heparin-based crosslinking or gelating agent (e.g. in addition to phytic acid). Aqueous solutions of heparin (0.210% w/w) were prepared using 5M NaOH. Photo-cross-linkable heparin methacrylate (Hep-MA) precursors were prepared by combining heparin (porcine source, Mw~1719 kDa) incubated with methacrylic anhydride (MA) and adjusted to pH=8. The degree of substitution (DS) of methacrylate groups covalently linked to heparin precursors was measured by 1H nuclear magnetic resonance. The DS was determined from integral ratios of peaks of the methacrylate groups at 6.2 ppm compared to peak corresponding to methyl groups in heparin at 2.05 ppm.

Solutions used for photopolymerization were incubated with 2-methyl-1-[4-(hydeoxyethoxy)phenyl]-2-methyl-1-propanone (Irgacure 2959) to create final concentrations of 0.5% (w/w) of photoinitiator. Gels were photo-cross-linked using UV illumination for 30-60 min ($\lambda$max=365 nm, 10 mW/cm$^2$). Hep-MA/PANI dual-networks were formed by sequentially incubating cross-linked Hep-MA hydrogels in aqueous solutions of ANI ($[ANI]_0$, between 0.1 and 2 M, 10 min) and acidic solutions of APS ($[APS]_0$, between 12.5 mM and 2 M, 20120 min). The gel fraction of Hep-MA/PANI dual networks was recovered by washing in di $H_2O$ after oxidative polymerization. Graphene sheets could be added into the reacting mass during various stages of reactions before casting or coating, but preferably added right before photopolymerization.

Example 11: Li—S Cell Containing a Graphene/PPy Composite Film-Bonded Metal Foil Current Collector at the Anode and at the Cathode Two (3) Li—S cells were prepared and tested, each one having a lithium foil as the anode active material, a sulfur/expanded graphite composite (75/25 wt. ratio) as the cathode active material, 1M of $LiN(CF_3SO_2)_2$ in DOL as the electrolyte, and a Celgard 2400 as the separator. The first cell (a baseline cell for comparison) contains a 10-$\mu$m thick Cu foil as the anode current collector and a 20-$\mu$m thick Al foil as the cathode current collector. The second cell has a GO-bonded Cu foil (totally 12-$\mu$m thick) of the present disclosure as the anode current collector and a sheet of a 20-$\mu$m thick GO-coated Al foil as the cathode current collector, prepared from micro-gravure coating process.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, and the binder, but excluding the current collectors). The specific energy and specific power values presented in this section are based on the total cell weight (including anode and cathode, separator and electrolyte, current collectors, and packaging materials). The morphological or micro-structural changes of selected samples after a desired number of repeated charging and recharging cycles were observed using both transmission electron microscopy (TEM) and scanning electron microscopy (SEM). Post-cycling inspection of the cells indicate that Al foil in all prior art electrodes suffered a severe corrosion problem. In contrast, the presently invented graphene/PANi network-bonded Al current collectors remain intact.

The invention claimed is:

1. A composite thin film for a battery or supercapacitor, said composite thin film comprising graphene sheets dispersed in or bonded by an electron-conducting polymer network, wherein said composite thin film has a thickness from 2 nm to 500 $\mu$m and an electrical conductivity from $10^{-4}$ to $10^4$ S/cm and wherein the graphene sheets occupy from 10% to 99% by weight and the polymer network from 1% to 90% by weight of the total composite weight, wherein said electron-conducting polymer network comprises chains of a conjugated polymer selected from poly(3-alkylthiophenes), poly(2,5-bis(cholestanoxy) phenylene vinylene), poly(2,5-dialkoxy) paraphenylene vinylene, poly[(1,4-phenylene-1,2-diphenylvinylene)], polyparaphenylene sulphide, polyheptadiyne, poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), a derivative thereof, a copolymer thereof, or a combination thereof, or comprises polythiophene hydrogel polymer in a dehydrated state.

2. The composite thin film of claim 1, wherein the graphene sheets comprise sheets of a graphene material selected from pristine graphene, graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

3. The composite thin film of claim 1, wherein the graphene sheets comprise single-layer graphene or few-layer graphene, wherein a few-layer graphene sheet consists of 2-10 graphene planes.

4. The composite thin film of claim 1, wherein the graphene sheets in the composite thin film are aligned to be substantially parallel to one another.

5. A current collector comprising the composite thin film of claim 1.

6. The current collector of claim 5, wherein the current collector comprises a metal tab that is bonded to the composite thin film and is used as a terminal pole for connection to an external circuit.

7. A current collector comprising a metal foil having two primary surfaces, wherein at least one of the primary surfaces is chemically bonded to the composite thin film of claim 1 to form the current collector.

8. The current collector of claim 7, wherein the metal foil is selected from Cu, Ti, Ni, stainless steel, Ti, or Al foil.

9. The current collector of claim 7, wherein a surface of the metal foil is free from a passivating layer.

10. The current collector of claim 7, wherein said metal foil is porous, containing surface pores, interior pores, or through-thickness holes.

11. A battery or capacitor using the composite thin film of claim 1 as a current collector.

12. A battery or capacitor comprising the current collector of claim 7.

13. A process of producing the composite thin film of claim 1, said process comprising: (a) dispersing multiple graphene sheets in a reacting mass comprising an oligomer or a monomer, an initiator or catalyst, a curing or cross-linking agent, and/or a liquid solvent to form a reacting suspension; (b) depositing a wet layer of said reacting suspension onto at least one of the two primary surfaces of a solid substrate; and (c) polymerizing or crosslinking the reacting suspension and at least partially removing any liquid or unreacted ingredients to form said composite thin film supported by the solid substrate.

14. The process of claim 13, wherein (b) comprises a procedure selected from casting, coating, printing, spraying, painting, extrusion, or a combination thereof.

15. The process of claim 13, wherein the composite thin film has a layer thickness from 2 nm to 100 nm and the solid substrate comprises a metal foil having a thickness from 1 μm to 30 μm.

16. The process of claim 13, wherein said solid substrate comprises a metal foil selected from Cu, Ti, Ni, stainless steel, Ti, or Al foil.

17. The process of claim 13, wherein the solid substrate comprises a metal foil and the process further comprises a procedure of chemically etching a surface of the metal foil to remove a surface-borne passivating layer prior to (b).

18. The process of claim 13, wherein (b) and (c) include depositing and forming a layer of said composite thin film on each of said two primary surfaces of the solid substrate.

19. The process of claim 13, wherein said solid substrate comprises a metal foil that is porous, containing surface pores, interior pores, or through-thickness holes.

20. The process of claim 13, which is a roll-to-roll process wherein said (b) and (c) include feeding a continuous sheet of said solid substrate from a roller to a deposition zone, depositing a wet layer of said reacting suspension onto said at least one primary surface of said solid substrate, polymerizing or crosslinking the reacting suspension to form a composite film, and collecting the composite film on a collector roller.

21. The process of claim 13, wherein the solid substrate is selected from a sheet, film, or block of a glass, ceramic, plastic, rubber, or metal and the process further comprises peeling off the composite thin film from the solid substrate to obtain a free-standing composite thin film.

22. The process of claim 13, wherein (b) of depositing comprises subjecting the reacting suspension to a shear stress and/or conducting (c) of polymerizing or crosslinking the reacting suspension under compression to align the graphene sheets to be substantially parallel to one another.

* * * * *